(No Model.)
A. M. LESLIE.
MECHANICAL MOVEMENT.
No. 444,757. Patented Jan. 13, 1891.
Fig. 1.
Fig. 3.
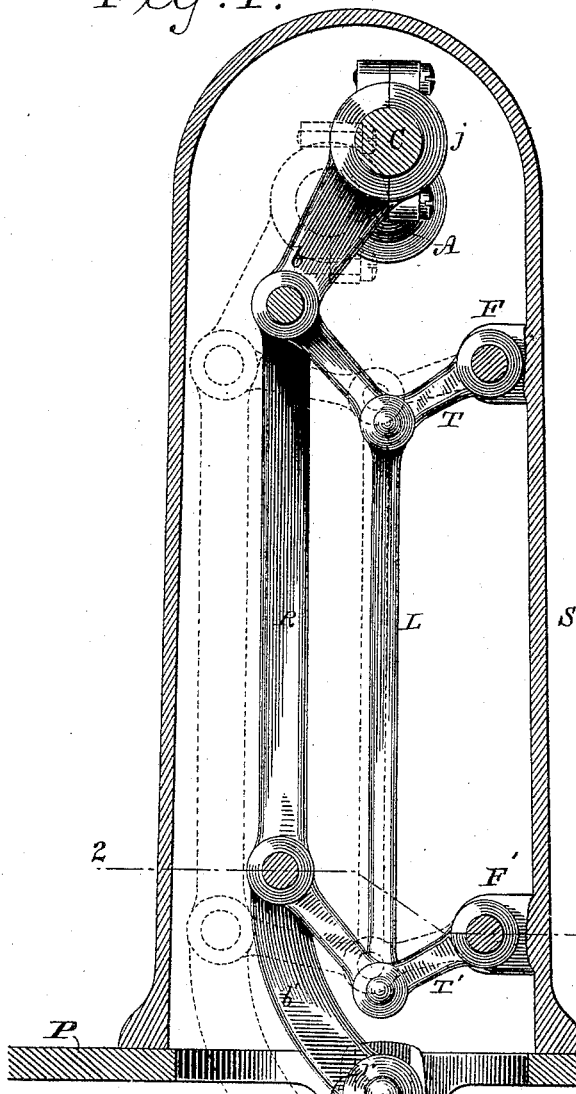
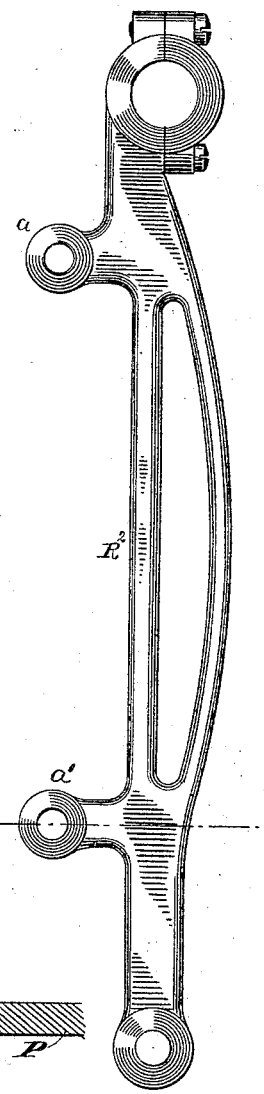
Fig. 2.
Fig. 3.ˣ
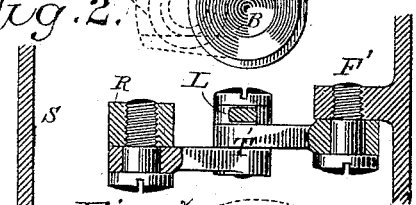
Fig. 1.ˣ
Witnesses:
H. C. Newman,
Ed. A. Newman.
Inventor.
ARTHUR M. LESLIE,
By his Attorney,

UNITED STATES PATENT OFFICE.

ARTHUR M. LESLIE, OF CHICAGO, ILLINOIS.

MECHANICAL MOVEMENT.

SPECIFICATION forming part of Letters Patent No. 444,757, dated January 13, 1891.

Application filed September 22, 1887. Renewed August 15, 1888. Again renewed July 5, 1890. Serial No. 357,800½. (No model.)

*To all whom it may concern:*

Be it known that I, ARTHUR M. LESLIE, a citizen of the United States, and a resident of Chicago, in the State of Illinois, have invented a new and useful Improvement in Mechanical Movements, of which the following is a specification.

This invention relates to mechanical devices for transmitting motion between parallel horizontal shafts, so that both shall rotate in one and the same direction, and with reference also to the avoidance of friction and noise, so that the shafts may be run at high speeds.

My present invention consists in a novel combination of parts and in a peculiar embodiment of the same, whereby the objects above named are accomplished in a very simple and compact mechanical movement. This movement is primarily designed for sewing-machines, and is adapted to be inclosed within the customary hollow standard which supports the overhanging arm of the machine, one shaft being mounted in said arm and the other below the cloth-plate of the machine. Thus applied, with the upper shaft as the driving-shaft, the movement provides at once for turning the driving-shaft toward the operator, which is more convenient in starting the machine and for turning a rotary shuttle or a rotary loop-taker of any description toward the operator, which is essential in connection with the customary feed, carrying the work away from the operator. It also provides for running the machine at high speeds without noise or excessive friction. My present invention includes this combination of parts last named.

A sheet of drawings accompanies this specification as part thereof.

Figure 1 of the drawings represents a vertical section through the standard of a rotary-shuttle sewing-machine provided with said peculiar embodiment of my said mechanical movement. Fig. 1× is a diagram supplemental to the same. Fig. 2 represents a section of the same on the line 2 2, Fig. 1. Fig. 3 is an elevation of a substitute pitman illustrating certain modifications; and Fig. 3× represents a section on the line $x\ x$, Fig. 3, with supplemental parts added, substantially as shown in Figs. 1 and 2.

Like letters of reference indicate corresponding parts in the several figures.

A B, Fig. 1, represent parallel horizontal shafts mounted in suitable fixed bearings and designed to rotate in one and the same direction, which, in a sewing-machine, is toward the operator for the aforesaid reasons, the upper shaft A being in this case the driving-shaft and provided with the customary pulley and hand-wheel, which are not shown in the drawings, and serving to drive the needle and take-up, and it may be the feed of the machine, while the lower shaft B drives the remainder of the stitch-making devices, including a rotary shuttle or loop-taker. All of these sewing-machine devices are or may be of ordinary construction as regards this invention, and are consequently omitted from the drawings.

S represents the standard of a sewing-machine comprising such devices and P its cloth-plate.

The shafts A A are provided, substantially in line with the vertical center of the standard S or substantially in a given vertical plane, with cranks C C², which are connected by a connecting-rod or pitman-like connection R or R², that may be coupled to the respective cranks in any approved way. In the example a journal-box $j$ embraces the central wrist of the upper crank C, and a laterally-projecting stud-roller $r$ at the lower end of the connection R works in a radial groove in the crank C². Between such connections with the cranks the connection R or R² is connected with a pair of fixed abutments F F' by means of a pair of toggles T T', which are in turn connected with each other at their middle pivots by a vertical link L, which transmits motion from one toggle to the other so as to compel them to move in unison. The pivotal connections of the parts of the respective toggles T T' with each other and with the connection R, link L, and abutments F F' are preferably formed by shouldered screws, as shown in Figs. 2 and 3×. The distance between the centers of said pivotal connections at the connection R being the same as that between those at the abutments F F' and at said middle pivots of the toggles, it follows that the straight middle portion of the connection or a corresponding line and the link L are always parallel and "straight up and down," and the movements imparted to the upper end of the connection by the crank-shaft A are reproduced at its lower end and communicated to the shaft B through the crank $C^2$. The motions of the parts are illustrated in Fig. 1 by dotted lines, showing them at the end of the first quarter-turn of the said shaft A from its full-line position. To render the movement as compact as possible with toggles of a given length, so as to inclose the whole within a standard of moderate size, said fixed abutments F F' are located at the back of the standard S and said pivotal connections of the connection R or $R^2$ with the toggles T T' are thrown forward by bends $b\ b'$, Fig. 1, at its respective ends or by arms $a\ a'$, Figs. 3 and $3^\times$, so as to locate the link L under the shaft A. In the modification last named the connection $R^2$ and link L work side by side, as shown in Fig. $3^\times$, and the parts are consequently coupled up somewhat differently as compared with the arrangement represented by Figs. 1 and 2. Otherwise and in effect the two movements are substantially alike.

An eccentric may take the place of the upper crank C, the lower bend of the connection R, Figs. 1 and 2, may in some cases be omitted, owing to the location of the lower shaft, and other like modifications will suggest themselves to those skilled in the art.

By locating the lower shaft B out of line with the upper shaft A, the motion of the former and of a rotary shuttle or the like carried by the same may be rendered "fast and slow," as illustrated by Fig. $1^\times$, in which $y$ represents the path of the center of the roller $r$, Fig. 1, and $z$ that of the outer end of the crank $C^2$ with the lower shaft B hung farther back, or it may be farther forward.

Having thus described my said improvement in mechanical movements, I claim as my invention and desire to patent under this specification—

1. The combination of two horizontal shafts parallel with each other and provided with motion-transmitting devices, as cranks, a connection between the latter, a pair of toggles, each of which is coupled at one end to said connection and at its other end to a fixed abutment, and a link connecting the middle pivots of said toggles, substantially as herein specified.

2. The combination, substantially as herein specified, of a hollow standard provided at its back with a pair of fixed abutments, a motion-transmitting connection working vertically within said standard, and having a rearwardly-bent upper end, a pair of horizontal shafts to which said connection is coupled at its respective ends, a pair of toggles coupled to said abutments and to said connection at their respective ends, and a vertical link connecting the middle pivots of said toggles, for the purpose set forth.

3. The combination, substantially as herein specified, of a hollow standard provided at its back with a pair of fixed abutments, a motion-transmitting connection working vertically within said standard, a pair of horizontal shafts to which said connection is coupled at its respective ends, the upper shaft being the driving-shaft, a pair of toggles coupled to said abutments and to said connection at their respective ends, and a vertical link connecting the middle pivot of said toggles, whereby high-speed rotary motion may be transmitted from the upper shaft to the under shaft in one and the same direction, in the manner set forth.

ARTHUR M. LESLIE.

Witnesses:
E. J. BAKER,
C. W. MARSH.